US008278881B2

(12) United States Patent
Woody et al.

(10) Patent No.: US 8,278,881 B2
(45) Date of Patent: *Oct. 2, 2012

(54) POWER GRID LOAD MANAGEMENT FOR PLUG-IN VEHICLES

(75) Inventors: George R. Woody, Redondo Beach, CA (US); Brian A. Welchko, Torrance, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/189,442

(22) Filed: Jul. 22, 2011

(65) Prior Publication Data

US 2011/0282535 A1    Nov. 17, 2011

Related U.S. Application Data

(62) Division of application No. 11/867,492, filed on Oct. 4, 2007, now Pat. No. 8,054,048.

(51) Int. Cl.
*H02J 7/04* (2006.01)
*H02J 7/00* (2006.01)
*H04M 11/04* (2006.01)
*G01C 21/30* (2006.01)

(52) U.S. Cl. .......... 320/162; 320/109; 320/112; 379/37; 379/45; 701/209; 701/22

(58) Field of Classification Search ................ 320/162
See application file for complete search history.

(56) References Cited

U.S. PATENT DOCUMENTS

| 5,642,270 | A |   | 6/1997  | Green et al. |
| 5,684,379 | A | * | 11/1997 | Svedoff ........................ 320/125 |
| 5,803,215 | A | * | 9/1998  | Henze et al. ...................... 191/2 |
| 6,381,522 | B1 | * | 4/2002  | Watanabe et al. ............... 701/22 |
| 6,487,477 | B1 | * | 11/2002 | Woestman et al. ............. 701/22 |
| 2004/0204797 | A1 | * | 10/2004 | Vickers ............................ 701/1 |
| 2005/0195078 | A1 | * | 9/2005  | Basinger et al. ............... 340/521 |
| 2005/0222933 | A1 | * | 10/2005 | Wesby ............................ 705/36 |
| 2006/0052918 | A1 | * | 3/2006  | McLeod et al. ................. 701/29 |
| 2007/0188137 | A1 | * | 8/2007  | Scheucher .................... 320/116 |

* cited by examiner

*Primary Examiner* — Yalkew Fantu
(74) *Attorney, Agent, or Firm* — Ingrassia Fisher & Lorenz, P.C.

(57) ABSTRACT

Methods and systems are provided for controlling the charging of an onboard energy storage system of a plug-in vehicle using a remote command center, such as a vehicle telematics service. An embodiment of such a method involves the transmission of a charge request for the onboard energy storage system to a remote command center associated with the plug-in vehicle. In response to the charge request, a charge command is received from the remote command center. The charging of the onboard energy storage system is regulated in accordance with the received charge command, which may be a charge enable command or a charge disable command.

8 Claims, 4 Drawing Sheets

POWER GRID LOAD MANAGEMENT FOR PLUG-IN VEHICLES

CROSS-REFERENCE TO RELATED APPLICATION

This application is a divisional of U.S. patent application Ser. No. 11/867,492, filed Oct. 4, 2007, and issued on Nov. 8, 2011 as U.S. Pat. No. 8,054,048.

TECHNICAL FIELD

The subject matter described herein generally relates to charging systems and methodologies for plug-in electric and hybrid electric vehicles. More particularly, the subject matter described herein relates to a system and related methods for centralized management and controlling of the charging of an onboard energy storage system of plug-in vehicles.

BACKGROUND

Hybrid electric and other fuel efficient vehicles are becoming increasingly popular. Plug-in hybrid electric vehicles and plug-in fully electric vehicles represent another category of vehicle that has less dependency on petroleum-based fuel. These vehicles are known as plug-in hybrid vehicles because their onboard energy storage systems (e.g., battery packs) are recharged by connecting (plugging in) the vehicle to an outlet, a charger or other voltage source, as well as from regenerative capture. In contrast to the conventional hybrid electric vehicles currently on the market, a plug-in hybrid vehicle can utilize its onboard energy storage system as the primary propulsion system for an extended range (up to 50 miles in some cases). After the onboard energy storage system has been depleted of its usable energy, an internal combustion engine (ICE) and/or a fuel cell in the plug-in hybrid vehicle is used as the primary propulsion system. Another type of plug-in hybrid vehicle (i.e., range extended electric vehicle) uses electricity as its sole propulsion system—an ICE or a fuel cell is used to recharge the onboard energy storage system as needed during operation. Although regenerative braking can be used to partially recharge the onboard energy storage system in these plug-in hybrid vehicles, recharging is typically performed by a charger that is connected to the local power grid architecture.

The number of plug-in vehicles currently in operation is rather low. However, it is reasonable to forecast that the number of plug-in vehicles on the road will steadily increase over time. Indeed, it is likely that in the future a large number of plug-in vehicles will need to be recharged at the same time or during the same extended period of time (e.g., overnight or during working hours). This will create high demands on power grid architectures, which deliver power across cities, counties, states, and countries. For example, overloading of a power grid architecture may occur when a large number of plug-in vehicles are concurrently plugged in for purposes of recharging. In practice, a power grid architecture cannot be expected to handle full power demand at all electrical outlets at any given time. Accordingly, when charging plug-in vehicles, it cannot be assumed that power from the respective power grid architecture will always be available (due to high power demands during certain hours of the day, the dependency on variable power sources such as wind generated energy and solar energy, and other practical factors).

BRIEF SUMMARY

A method of controlling the charging of an onboard energy storage system of a plug-in vehicle is provided. The method involves: transmitting a charge request for the onboard energy storage system to a remote command center associated with the plug-in vehicle; receiving a charge command from the remote command center in response to the charge request; and regulating charging of the onboard energy storage system in accordance with the charge command.

Another method of controlling the charging of an onboard energy storage system of a plug-in vehicle is provided. This method involves: receiving, from the plug-in vehicle, a charge request for the onboard energy storage system; obtaining vehicle location data that indicates a location of the plug-in vehicle; determining, from the charge request and the vehicle location data, whether to charge the onboard energy storage system; and in response to the determining step, transmitting a charge command to the plug-in vehicle, the charge command comprising data that regulates charging of the onboard energy storage system.

A system for controlling the charging of onboard energy storage systems of plug-in vehicles is also provided, where each of the plug-in vehicles comprises a charge control module for its onboard energy storage system. An embodiment of the system includes: a remote command center configured to support data communication with the plug-in vehicles; a power grid architecture for delivery of electrical energy; and chargers coupled to the power grid architecture, the chargers being configured to provide charging energy from the power grid architecture to the onboard energy storage systems of the plug-in vehicles. In this embodiment the remote command center is configured to remotely regulate charging of the onboard energy storage systems of the plug-in vehicles using charge commands transmitted from the remote command center to the plug-in vehicles.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

DESCRIPTION OF THE DRAWINGS

At least one embodiment of the present invention will hereinafter be described in conjunction with the following drawing figures, wherein like numerals denote like elements.

DESCRIPTION OF AN EXEMPLARY EMBODIMENT

Figure 1:
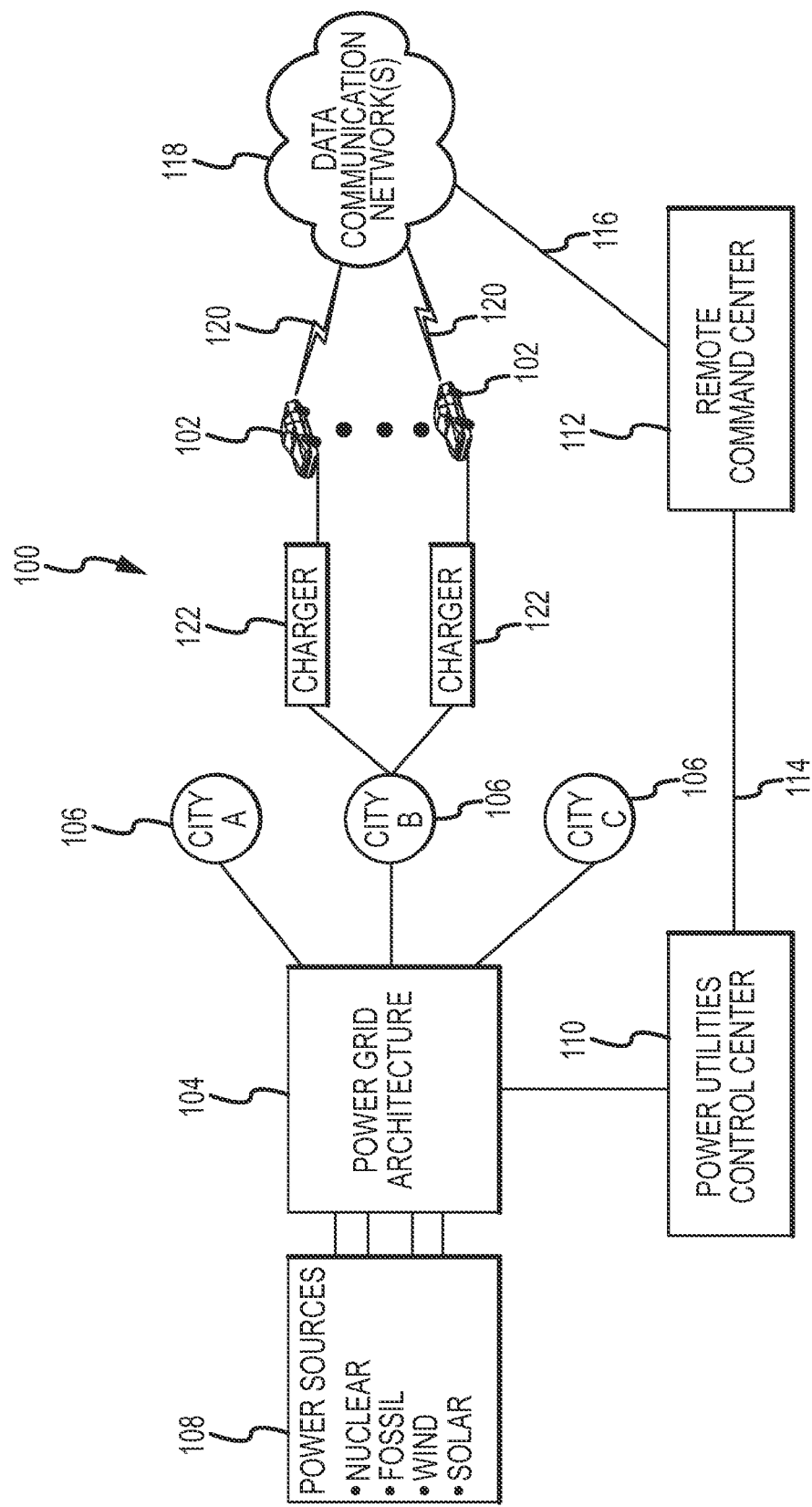
FIG. 1 is a simplified schematic diagram of an embodiment of a system for controlling the charging of onboard energy storage systems of plug-in vehicles.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Techniques and technologies may be described herein in terms of functional and/or logical block components and various processing steps. It should be appreciated that such block components may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments may be practiced in conjunction with any number of data transmission protocols and that the system described herein is merely one suitable example.

For the sake of brevity, conventional techniques related to signal processing, data transmission, electric power systems, power grid management and control, vehicle telematics systems and services, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the subject matter.

The following description may refer to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically.

System and method embodiments are described below with reference to a practical deployment of a plug-in hybrid electric vehicle. It should be appreciated that the system and method embodiments can be equivalently practiced in the context of a fully electric vehicle, and the scope and application of the techniques and technologies described herein are not limited to any particular vehicle type or configuration.

A plug-in hybrid vehicle utilizes a charger to recharge its onboard energy storage system (e.g., battery pack). In practice, the charger is a relatively high power unit that provides power in the kilowatt range. For example, a plug-in hybrid vehicle may utilize a relatively low power onboard charger (1.5 kilowatts) or a relatively high power onboard or external charger (6.6 kilowatts). An external charger may be deployed as a standalone component that is plugged into a standard AC outlet (e.g., a 110 volt outlet or a 220 volt outlet). The techniques and technologies described here are compatible for use with plug-in vehicles that use onboard and/or external chargers.

The system described here leverages a vehicle telematics system such as the ONSTAR® communication system. As used herein, a vehicle telematics system is a system that combines telecommunications with informatics (informatics being the science, practice, and engineering of information systems). In practice, a vehicle telematics system might leverage a cellular system. Similarly, modern cell phones use cellular service to obtain GPS and other information. This GPS feature allows utility companies to locate where vehicles are actually charging their vehicle and obtain charge command information needed for load leveling of the utility grid. Conversely, the cellular GPS feature can help the user find where to charge the vehicle. Both the ONSTAR® communication system and cell phones or cellular based technologies can be used to deploy the embodiments described herein.

Telematics systems support data communication (usually wireless) between one or more onboard vehicle systems and a remote command center, entity, network, or computing architecture. Telematics systems typically support bidirectional data transfer such that the remote command center can provide services to the user of the vehicle, upgrade software-based vehicle components, receive diagnostic vehicle data for storage and/or processing, receive emergency calls from a user of the vehicle, etc. Telematics systems are capable of tracking the current locations of compatible vehicles using satellite-based global positioning system (GPS) technology. Telematics systems are well known to those familiar with the automotive industry, and as such they will not be described in detail here.

The system described here links a telematics system with an onboard electrical energy storage system of a plug-in vehicle. More specifically, the system allows the telematics system to communicate with the onboard charge control module and processing logic that regulates the charging of the onboard energy storage system of the vehicle. Information from the charge control module, such as the state of charge (SOC) and/or state of health (SOH) of a battery cell or a battery pack, can be sent to the onboard telematics system module using the onboard data communication bus or architecture. The onboard telematics system module can then send the SOC/SOH data, GPS-based vehicle location data, and other data to a remote command center (which may be maintained by the telematics system provider and/or another entity such as a utility company).

In an embodiment where the remote command center is associated with the telematics system provider, the remote command center can relay the SOC/SOH data and the vehicle location data to one or more power utility companies, which then utilize this information to control, manage, and regulate the charging of vehicles and, if needed, determine how to best allocate power across one or more power grid architectures according to current power consumption demands. Notably, such power grid load balancing can be accomplished wirelessly from the plug-in vehicles to the utility companies. The data communication between a vehicle and its host telematics system, and between that telematics system and the utility companies, may be performed in accordance with one or more wireless data communication protocols, such as, without limitation: cellular; satellite; BLUETOOTH® wireless data communication; or IEEE 802.11 (any applicable variant).

The use of a data communication link between plug-in vehicles and utility companies (via a telematics system) enables the utility companies to remotely regulate and control the duration of charging periods, when charging occurs, and/or charging power levels. In addition, the system described here allows the utility companies to better perform load leveling and power distribution, which can be important when weather dependent power sources (solar or wind) are used for the power grid. The system will also enable the utility companies to perform load balancing and power distribution when needed based upon plug-in vehicle charging demand, geographic location, time, and possibly other factors. One important benefit relates to power grid stabilization during peak use hours. The system allows the utility companies to bring load on-line or shed load very quickly as needed. This ability is an enabler to allow higher percentages of renewable power sources (e.g., wind or solar), which have power generating characteristics that can change in a matter of minutes.

FIG. 1 is a simplified schematic diagram of an embodiment of a system 100 for controlling the charging of onboard energy storage systems of plug-in vehicles 102. FIG. 1 represents a geographical area supported by a power grid architecture 104 that is configured and designed for the delivery of electrical energy, where the geographical area can be of any practical size. For this example, the illustrated geographical area includes a plurality of cities 106 (labeled City A, City B, and City C for convenience).

Power grid architecture 104 represents the systems, infrastructure, power lines, transformers, power distribution equipment, control systems, and other components that are utilized to provide power to cities 106. In this regard, power grid architecture 104 obtains energy from one or more power sources 108. Power sources 108 may include any number of different energy generation sources, including, without limitation: nuclear sources; fossil fuel sources; wind power generators; hydroelectric; or solar power generators. Using well known techniques and technologies, power grid architecture 104 processes and distributes power from power sources 108 as needed throughout cities 106. In practice, power grid architecture 104 may include a number of distributed power sources 108, which may be deployed locally within cities 106. In practice, power grid architecture 104 may be managed by one or more power utility companies. For simplicity, this example assumes that power grid architecture 104 is supported and managed by one utility company, which maintains at least one power utilities control center 110 for power grid architecture 104. In practice, power utilities control center 110 may be included within power grid architecture 104 itself.

Power utilities control center 110 is suitably configured to manage, regulate, and otherwise control the operation of power grid architecture 104. For example, power utilities control center 110 can control the distribution of power throughout power grid architecture 104, perform power load balancing throughout power grid architecture 104, carry out rolling controlled blackouts within power grid architecture 104, and support any number of known and conventional power management and control operations. In addition, power utilities control center 110 may manage the importation or exportation of power to other power grid architectures in different geographical locations. As described in more detail below, this embodiment of power utilities control center 110 is coupled to a remote command center 112 to facilitate data communication that supports plug-in vehicle charging techniques. Remote command center 112 generally represents the systems, infrastructure, processing capabilities, and architecture associated with a telematics system that supports data communication with vehicles, including plug-in vehicles 102. In FIG. 1, the link 114 represents one or more wireless and/or wired data communication links between remote command center 112 and power utilities control center 110. Link 114 facilitates data communication in accordance with any number of known wired and/or wireless data communication protocols. In FIG. 1, the link 116 represents one or more wireless and/or wired data communication links between remote command center 112 and at least one data communication network 118. Link 116 facilitates data communication in accordance with any number of known wired and/or wireless data communication protocols.

In FIG. 1, data communication network(s) 118 generally represents the systems, infrastructure, processing capabilities, data transmission lines, wireless data communication channels, and architecture that supports the processing, routing, transmission, and/or transport of data between remote command center 112 and plug-in vehicles 102. Data communication network(s) 118 may be compatible with any number of known network types, techniques, technologies, and protocols (wired or wireless). Wireless data communication protocols, techniques, or methodologies supported by data communication network(s) 118, include, without limitation: RF; IrDA (infrared); BLUETOOTH®; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; cellular/wireless/cordless telecommunication protocols; wireless home network communication protocols; paging network protocols; magnetic induction; satellite data communication protocols; wireless hospital or health care facility network protocols such as those operating in the WMTS bands; GPRS; and proprietary wireless data communication protocols such as variants of Wireless USB. Wired data communication protocols, techniques, or methodologies supported by data communication network(s) 118 include, without limitation: Ethernet; home network communication protocols; USB; IEEE 1394 (Firewire); hospital network communication protocols; and proprietary data communication protocols.

Data communication network(s) 118 communicate with plug-in vehicles 102 via respective data communication links 120. Although shown as wireless links, data communication links 120 need not be wireless. Certain embodiments of plug-in vehicles 102 may be suitably configured to support wired data communication with data communication network(s) 118 (using, for example, a USB cable connected to a computer). For this embodiment, data communication links 120 represent cellular network links—current implementations of telematics systems leverage the existing cellular network service.

System 100 also cooperates with GPS satellites (not shown) that provide raw location data to onboard GPS systems located in plug-in vehicles 102. The onboard GPS systems can process the raw location data for use with an onboard navigation system. In addition, the onboard GPS systems provide the raw location data (and/or processed vehicle location data derived from the raw location data) to remote command center 112 via data communication network(s) 118. Remote command center 112 utilizes the vehicle location data to support the plug-in vehicle charging techniques described in more detail below.

System 100 may include any number of chargers 122, which are coupled to power grid architecture 104. Although depicted as distinct components, a charger 122 may instead be integrated into a plug-in vehicle 102, or integrated into another structure such as a building or a vehicle charging station. Chargers 122 are suitably configured to provide charging energy from power grid architecture 104 to the onboard energy storage systems of plug-in vehicles 102. Notably, remote command center 112 is configured to remotely regulate charging of the onboard storage systems of plug-in vehicles 102 by chargers 122.

As described in more detail below, remote command center 112 transmits charge commands (via data communication network(s) 118) to plug-in vehicles 102, where the charge commands control whether or not plug-in vehicles 102 will be able to utilize the power provided by power grid architecture 104. For example, remote command center 112 can transmit charge enable commands for processing by the charge control modules of plug-in vehicles 102, where the charge enable commands activate a charging state of the onboard energy storage systems. On the other hand, remote command center 112 can transmit charge disable commands for processing by the charge control modules of plug-in vehicles 102, where the charge disable commands activate a non-charging state of the onboard energy storage systems. Therefore, assuming that plug-in vehicles 102 are configured to charge only in response to received charge enable commands, remote command center 112 can remotely control when any given plug-in vehicle 102 is charged. In this manner, remote command center 112 can generate a charging schedule for plug-in vehicles 102 coupled to power grid architecture 104, where the charging schedule is influenced by the current and/or the forecasted power load conditions for power grid architecture 104.

Figure 2:
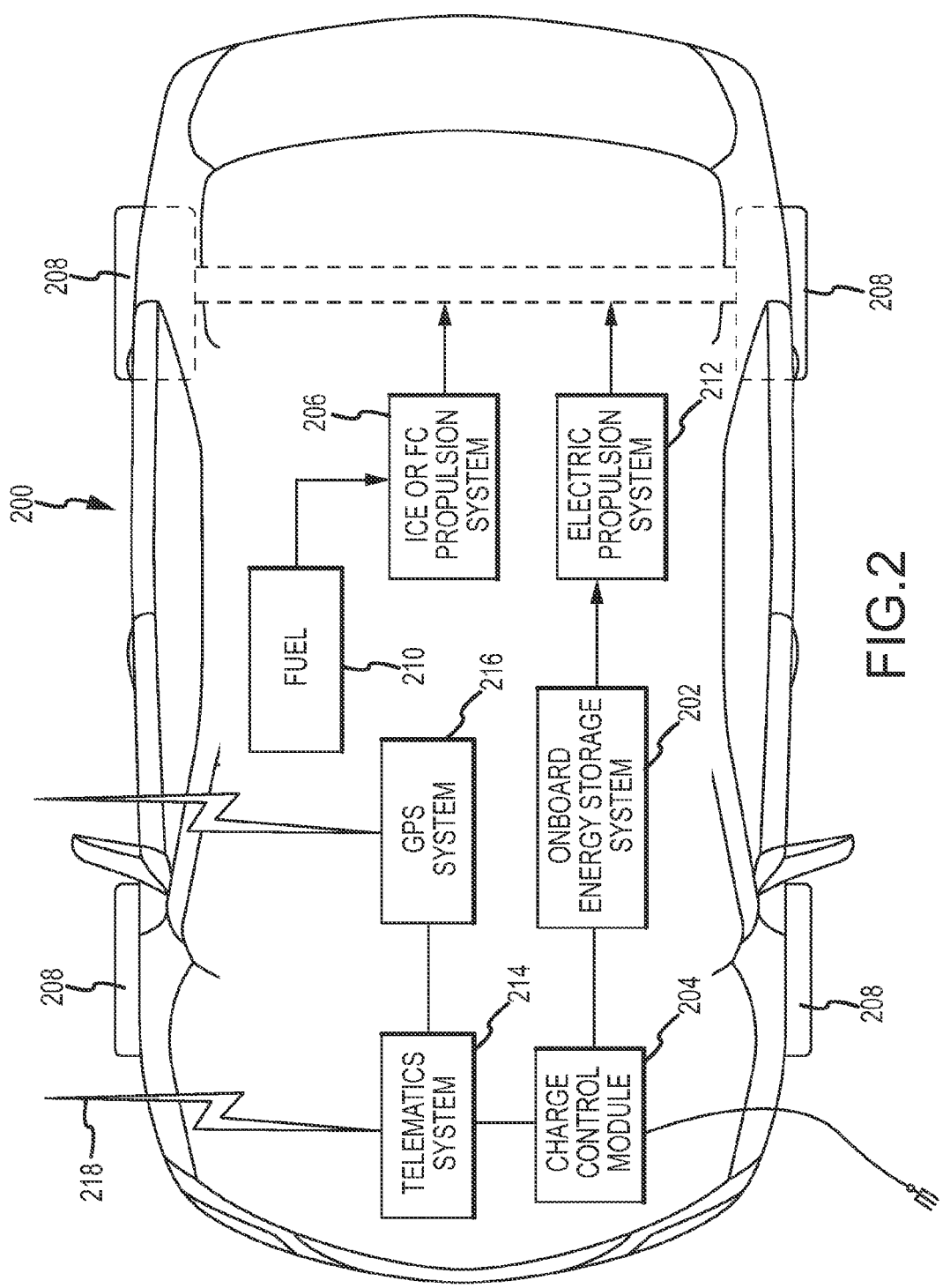
FIG. 2 is a simplified schematic representation of an embodiment of a plug-in vehicle that is suitable for use in the system shown in FIG. 1.

FIG. 2 is a simplified schematic representation of an embodiment of a plug-in vehicle 200 that is suitable for use in system 100. Indeed, each plug-in vehicle 102 may include the components depicted in FIG. 2. Plug-in vehicle 200 is a hybrid electric vehicle; however, the charging techniques and concepts described here are also applicable to a pure electric plug-in vehicle or a range extended electric vehicle. The illustrated embodiment of plug-in vehicle 200 includes, without limitation: an onboard energy storage system 202; a charge control module 204 coupled to onboard energy storage system 202; a propulsion system 206; wheels 208; a fuel supply 210 for propulsion system 206; an electric propulsion system 212 coupled to onboard energy storage system 202; an onboard telematics system 214 coupled to charge control module 204; and an onboard GPS system 216 coupled to onboard telematics system 214. Electronic devices, electronic control modules, and processing components of plug-in vehicle 200 may be coupled together using a data communication bus, conductive elements, and/or any suitably configured interconnection architecture. FIG. 2 is a schematic diagram that depicts various electrical and mechanical connections and couplings in a very simplified manner for ease of description. An embodiment of plug-in vehicle 102 will of course utilize additional physical components and devices that are well known in the automotive industry.

Onboard energy storage system 202 may be realized as a rechargeable battery pack having a single battery module or a plurality of individual battery modules. In this regard, onboard energy storage system 202 may utilize lithium-ion batteries, nickel metal hydride (NiMH) batteries, lead acid batteries, or lithium polymer batteries connected to produce the desired operating voltage. Plug-in vehicle 200 may include an energy management controller (not shown), which obtains, derives, monitors, and/or processes a set of parameters associated with onboard energy storage system 202. These parameters may include, without limitation: current; voltage; SOC; SOH; battery internal resistances; battery internal reactances; and power output. In some embodiments, the energy management controller may be incorporated into charge control module 204. The parameters obtained by the energy management controller can be utilized by the charging system to determine whether onboard energy storage system 202 needs to be charged and, if so, to what extent.

Onboard energy storage system 202 provides electrical energy that enables electric propulsion system 212 to provide traction power to wheels 208. Certain embodiments of plug-in vehicle 200 employ a motor generator (MoGen), which is dynamically coupled to propulsion system 206 (e.g., an internal combustion engine (ICE) or a fuel cell (FC) propulsion system). This MoGen functions as either a motor to propel plug-in vehicle 200 or a generator to charge onboard energy storage system 202, depending on the operating state of plug-in vehicle 200 (i.e., braking, accelerating, or operating at a constant speed on a highway). The MoGen is preferably an AC induction machine, but it may comprise any known electrical motor/generator technology including but not limited to DC machines, synchronous machines, and switched reluctance machines. In practice, plug-in vehicle 200 may have two MoGens: one utilized to drive the rear wheels; and another utilized to drive the front wheels.

The MoGens can be controlled by a suitably configured electrical control system, DC-DC converters, power inverter modules (PIMs), and the like. A control module in plug-in vehicle 200, including charge control module 204, may comprise any type of processing element or vehicle controller known in the art, and it can be equipped with nonvolatile memory, random access memory (RAM), discrete and analog input/output (I/O), a central processing unit, and/or communications interfaces for networking within an automotive communications network. In this regard, charge control module 204 (and possibly other illustrative blocks, modules, processing logic, and circuits described in connection with the embodiments disclosed herein) may be implemented or performed with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. A processor may be realized as a microprocessor, a controller, a microcontroller, or a state machine. A processor may also be implemented as a combination of computing devices, e.g., a combination of a digital signal processor and a microprocessor, a plurality of microprocessors, one or more microprocessors in conjunction with a digital signal processor core, or any other such configuration.

Moreover, the steps of a method or algorithm described in connection with the embodiments disclosed herein may be embodied directly in hardware, in firmware, in a software module executed by a processor, or in any practical combination thereof. A software module may reside in RAM memory, flash memory, ROM memory, EPROM memory, EEPROM memory, registers, a hard disk, a removable disk, a CD-ROM, or any other form of storage medium known in the art. In this regard, an exemplary storage medium can be coupled to a processor such that the processor can read information from, and write information to, the storage medium. In the alternative, the storage medium may be integral to the processor. As an example, the processor and the storage medium may reside in an ASIC.

The subject matter and certain aspects of the embodiments thereof may be described in the general context of computer-executable instructions, such as program modules, executed by one or more computing modules, controllers, or other devices. Generally, program modules include routines, programs, objects, components, data structures, and/or other elements that perform particular tasks or implement particular abstract data types. Typically, the functionality of the program modules may be combined or distributed as desired in various embodiments. A computing device that performs computer-executable instructions typically includes at least some form of computer readable media. Computer readable media can be any available media that can be accessed by a computing device and/or by applications executed by a computing device.

Referring again to FIG. 2, in the generator mode, the MoGens generate electrical energy that is transferred, via the PIMs, to onboard energy storage system 202 and the DC-DC converters. The direction of current flow for the MoGens is determined according to the particular operating state of plug-in vehicle 200. The DC-DC converters provide and regulate a DC bus that is pulse-width-modulated by the PIMs to supply time varying current to the MoGens. In a regenerative state (such as during braking) or charging condition, current will flow from the MoGens, via the PIMs, to charge onboard energy storage system 202 and provide current to the DC-DC converters. In a state where the MoGens are needed to provide propulsion, current will flow from onboard energy storage system 202 to the MoGens, via the DC-DC converters and PIMs, to power the MoGens.

For the embodiments described here, the SOC and/or the SOH of onboard energy storage system 202 is dynamically tracked to determine when to charge onboard energy storage system 202. In certain embodiments, the SOC is controlled to be within the range of 20% to 80% so that the charge acceptance and efficiency during regenerative braking can be realized. However, controlling onboard energy storage system 202 to any SOC percentage is within the scope of the embodiments described herein. Plug-in vehicle 200 may employ any appropriate technique to obtain the SOC and/or SOH of onboard energy storage system 202. For example, such techniques are disclosed in U.S. Pat. No. 6,639,385 and in United States patent application publication number 2004/0162683A1—the relevant content of these patent documents is incorporated herein by reference.

For embodiments where propulsion system 206 is an ICE, fuel supply 210 can be a supply of gasoline, alcohol, ethanol, diesel fuel, or the like. For embodiments where propulsion system 206 is a fuel cell, fuel supply 210 can be a supply of hydrogen, an alcohol, a hydrocarbon, or the like. The specific type of fuel in fuel supply 210 and the particular configuration and operation of propulsion system 206 are unimportant for purposes of the charging system and methodologies described here and, therefore, will not be described in detail.

Onboard telematics system 214 is suitably configured to facilitate data communication with a host remote command center (e.g., remote command center 112 depicted in FIG. 1). Onboard telematics system 214 can communicate with the remote command center using a wireless data communication link 218 as shown and/or a wired link. Onboard GPS system 216 is suitably configured to obtain GPS data from a GPS satellite system. For this embodiment, onboard GPS system 216 processes the received GPS data as needed, and provides vehicle location data to onboard telematics system 214. In turn, onboard telematics system 214 can send the vehicle location data to the remote command center.

Figure 3:
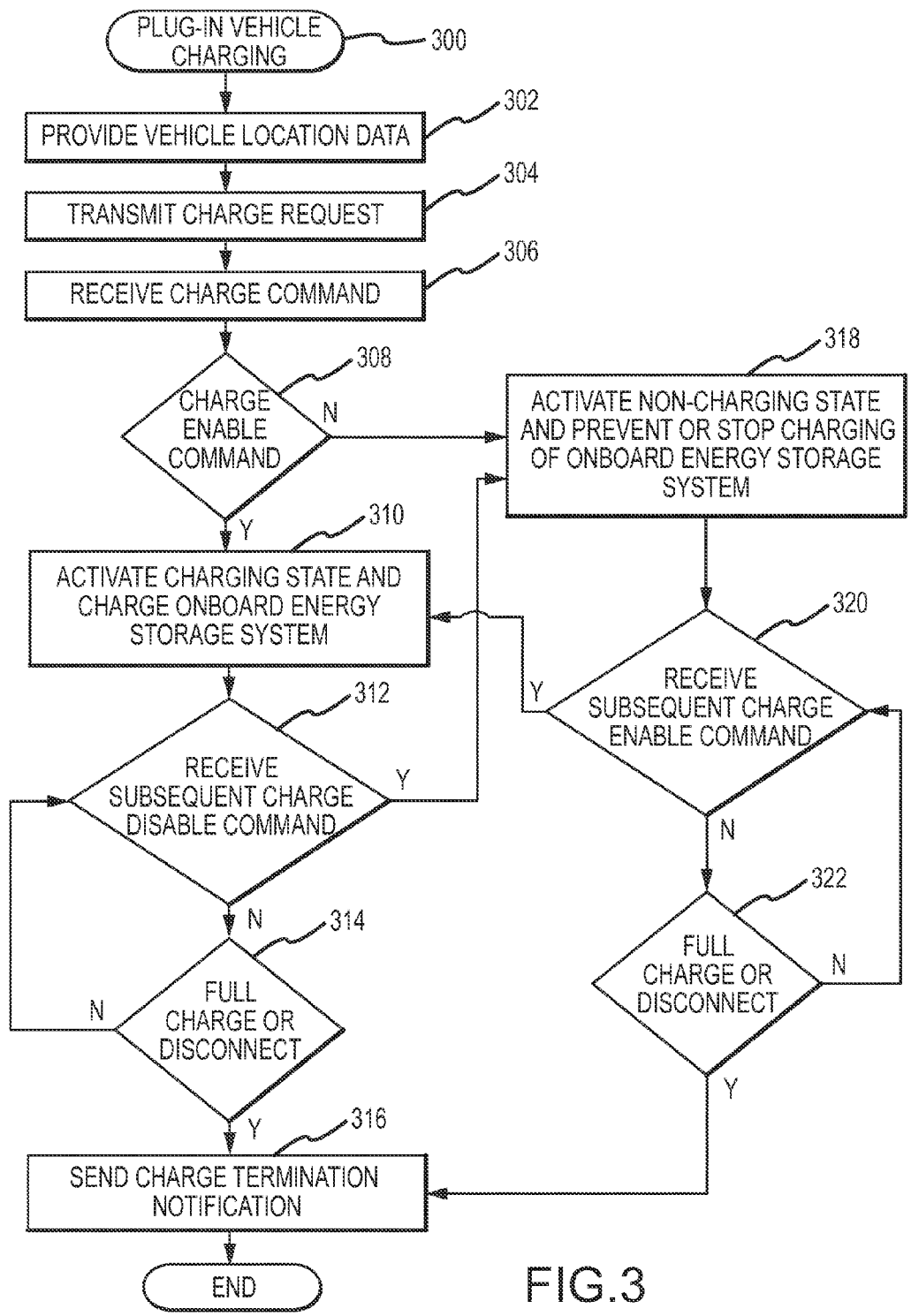
FIG. 3 is a flow chart that depicts an embodiment of a plug-in vehicle charging process.
Figure 4:
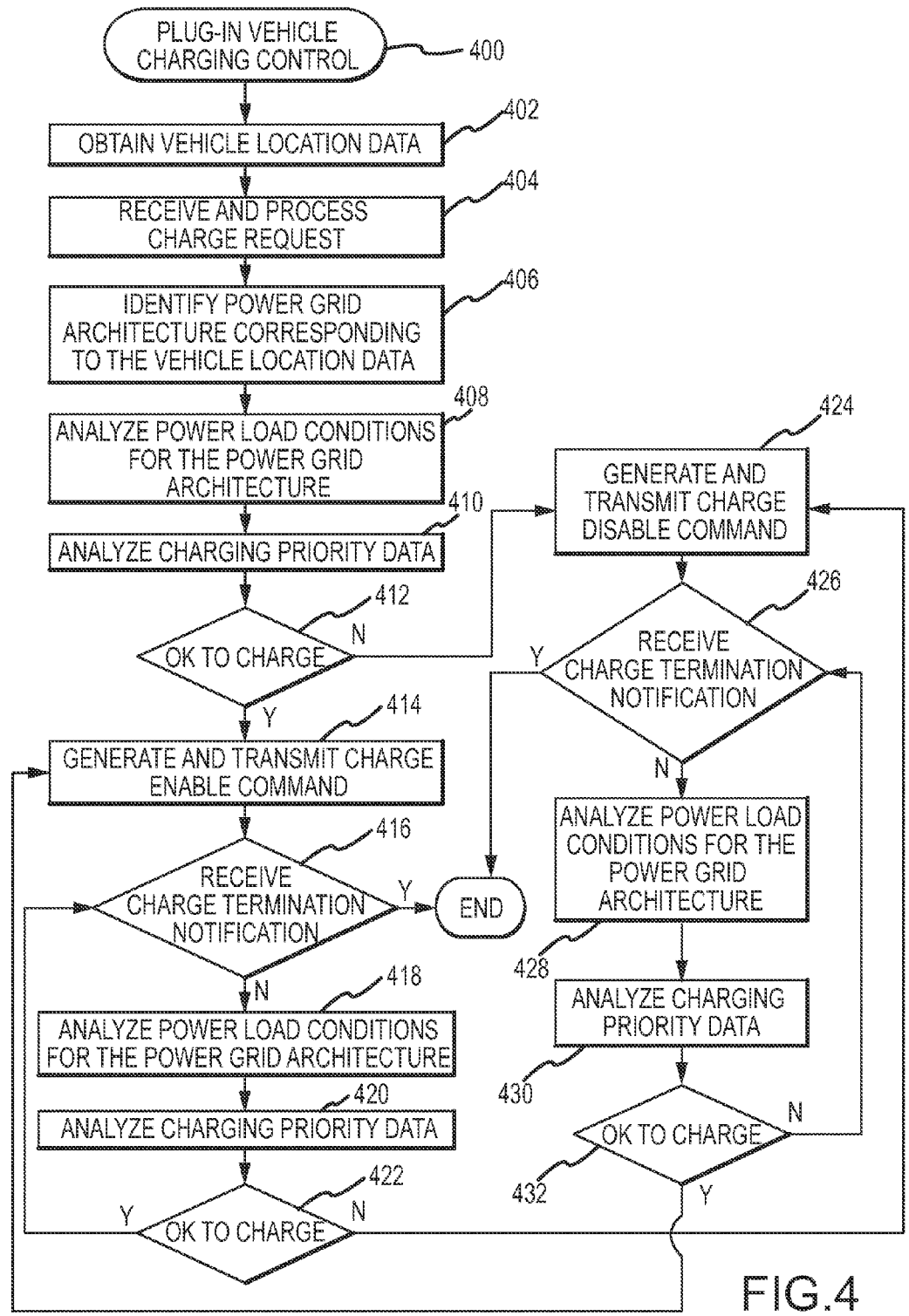
FIG. 4 is a flow chart that depicts an embodiment of a plug-in vehicle charging control process.

Components of plug-in vehicle 200 cooperate to support the charging techniques and methodologies described herein. In this regard, FIG. 3 is a flow chart that depicts an embodiment of a plug-in vehicle charging process 300, which may be performed by plug-in vehicles 102/200, and FIG. 4 is a flow chart that depicts an embodiment of a plug-in vehicle charging control process 400, which may be performed by remote command center 112 and/or power utilities control center 110. The various tasks performed in connection with these processes may be performed by software, hardware, firmware, or any combination thereof. For illustrative purposes, the following description of these processes may refer to elements mentioned above in connection with FIG. 1 or FIG. 2. In practice, portions of these processes may be performed by different elements of the described system. It should be appreciated that a given process may include any number of additional or alternative tasks, the tasks shown in FIG. 1 and FIG. 2 need not be performed in the illustrated order, and a given process may be incorporated into a more comprehensive procedure or process having additional functionality not described in detail herein.

As described above, the onboard telematics system of the plug-in vehicle will receive or generate vehicle location data that indicates the location of the plug-in vehicle. In preferred embodiments, the vehicle location data represents the current position of the plug-in vehicle as derived from GPS data. Process 300 provides the vehicle location data to the remote command center (task 302) or otherwise makes the vehicle location data accessible by the remote command center. From the perspective of the remote command center, process 400 obtains or receives the vehicle location data (task 402) from the plug-in vehicle. Notably, this exchange may occur at any time, and it need not be triggered by the user or the plug-in vehicle requesting a charge.

The following description of process 300 and process 400 assumes that the plug-in vehicle has been connected to a compatible charger (i.e., plugged in) and that the user desires to charge the onboard energy storage system of the plug-in vehicle. For this embodiment, process 300 initiates the charging procedure by transmitting a charge request (task 304) for the onboard energy storage system. The charge request is transmitted to an appropriate remote command center that is associated with the plug-in vehicle (for example, one to which the plug-in vehicle has subscribed). From the perspective of the remote command center, process 400 receives and processes the charge request (task 404). The charge request may be conveyed during a cellular network call established between the onboard telematics system and the remote command center. The charge request can convey data indicative of various information. For example, the charge request may convey any of the following items, without limitation: an identifier of the plug-in vehicle; the name of the driver or owner; the vehicle location data; SOC data that indicates the SOC of the onboard energy storage system; SOH data that indicates the SOH of the onboard energy storage system; the time; an anticipated window of time during which the plug-in vehicle will remain plugged in; priority data that indicates a relative charging priority for the plug-in vehicle (e.g., "charge immediately," or "charge within the next 60 minutes," or "charge whenever possible"); or the charge capability indicating the amount of energy the system can accept and/or the rate at which it can be charged.

The remote command center can process the received charge request and any relevant data associated therewith to determine whether to charge the onboard energy storage system of the plug-in vehicle. In practice, this determination is influenced by a number of factors and considerations, and the remote command center may utilize an appropriate software application that analyzes and processes the available data to arrive at a decision. An important influencing factor relates to the current power load conditions for the power grid architecture to which the plug-in vehicle is connected. In this regard, the remote command center can identify the particular power grid architecture corresponding to the vehicle location data (task 406) and analyze power load conditions for the identified power grid architecture (task 408). In practice, the vehicle location data should be accurate enough to enable the remote command center and/or the corresponding power utilities control center to unambiguously determine which power grid architecture (or a sub-grid thereof) provides power to the charger servicing the plug-in vehicle. The load balancing analysis can consider the current loading on the identified power grid architecture and/or other power grid architectures as needed such that the governing utility company can regulate, divert, and allocate power throughout its territory in an effective and intelligent manner. For example, if the power grid architecture (or sub-grid) to which the plug-in vehicle is connected is overloaded or is approaching an overloaded condition, then the remote command center may determine that the plug-in vehicle should not be immediately charged. On the other hand, if the power grid architecture (or sub-grid) to which the plug-in vehicle is connected is only lightly loaded, then the remote command center may determine that the plug-in vehicle can be charged at any time and for a relatively long period of time.

Another influencing factor is the priority data received from the plug-in vehicle. The priority data can be automatically generated by an onboard subsystem or it can be entered/selected by the operator of the plug-in vehicle using an appropriate user interface. The illustrated embodiment of process 400 analyzes the charging priority data (task 410) as an additional data point that influences the determination of whether or not to charge the plug-in vehicle. Thus, the remote command center can be configured to favor plug-in vehicles that send priority data that indicates an urgent charging need over plug-in vehicles that do not send any priority data, and over plug-in vehicles that send priority data that indicates a less urgent need to charge.

The SOC or SOH may also influence the decision to enable charging or disable charging. For example, the remote command center can be configured to favor plug-in vehicles that send SOC/SOH data that indicates a relatively low charge condition of the onboard energy storage system, while disfavoring plug-in vehicles that send SOC/SOH data that indicates a relatively high charge condition of the onboard energy storage system.

The status of the power grid, loading conditions of the power grid, and/or other characteristics of the power grid architecture may influence vehicle charging. For example, in the event of a power shortage or sudden change in the available power, the remote command center can disable charging, thus shedding load on the power system architecture.

Depending upon the system deployment, the remote command center can determine whether to charge the onboard energy storage system: (1) independently (i.e., based upon data obtained from the vehicle and data obtained from the power utilities control center); (2) as instructed by the power utilities control center (i.e., the remote command center may communicate with the power utilities control center and function as an intermediary for the vehicle); or (3) based upon recommendations provided by the utilities control center. This determination will influence the type of charge command transmitted to the plug-in vehicle, where a charge command includes data, instructions, or control parameters that regulates charging of the onboard energy storage system of the vehicle. In this regard, if process 400 determines to charge the plug-in vehicle (query task 412), then the remote command center will generate and transmit a charge enable command to the telematics system of the plug-in vehicle (task 414). On the other hand, if process 400 determines to not charge the plug-in vehicle, then the remote command center will generate and transmit a charge disable command to the telematics system of the plug-in vehicle (task 424).

From the perspective of the plug-in vehicle, process 300 receives a charge command (task 306) from the remote command center, where this charge command is received in response to the charge request transmitted during task 304. Thereafter, process 300 regulates charging of the onboard energy storage system in accordance with the received charge command (which may be a charge enable command or a charge disable command). If process 300 receives a charge enable command (query task 308), then process 300 will activate a charging state for the plug-in vehicle and begin charging the onboard energy storage subsystem (task 310). If not, then the received charge command is a charge disable command, and process 300 leads to task 318. This technique allows the remote command center to remotely control whether or not the plug-in vehicle can charge from the charger to which it is connected. For this embodiment, the plug-in vehicle continues to charge unless it receives a subsequent charge disable command; it becomes fully charged, or it is disconnected from the charger.

If the plug-in vehicle receives a charge disable command after receiving the initial charge enable command (query task 312), then process 300 leads to task 318. If not, then process 300 leads to query task 314. If query task 314 determines that the onboard energy storage system has been fully charged or if the plug-in vehicle has been disconnected from its charging power source, then process 300 transmits a suitably formatted charge termination notification to the remote command center (task 316). If not, then process 300 may be re-entered at query task 312 to repeat the processing loop represented by query task 312 and query task 314. The charge termination notification informs the remote command center of the fully charged state or of the disconnected state of the plug-in vehicle. This charge termination notification can be used by the remote command center as a prompt to update records for the plug-in vehicle, to initiate the generation and transmission of a final charge disable command, or the like. In certain embodiments, in conjunction with the transmission of this charge termination notification the plug-in vehicle automatically generates an internal charge disable command or otherwise switches out the onboard energy storage system from the charger to prevent overcharging. This functionality could be implemented by on onboard charge controller that is suitably designed to prevent overcharging of the battery by monitoring battery voltage and temperature.

As briefly mentioned above, task 318 is performed when the initial charge command is a charge disable command (query task 308) or when a subsequent charge disable command is received (query task 312). In connection with task 318, process 300 will activate a non-charging state for the plug-in vehicle and prevent or stop charging of the onboard energy storage subsystem. While in the non-charging state, the plug-in vehicle consumes little or no energy from the charger, even though it remains coupled to the power grid architecture. For this embodiment, the plug-in vehicle remains in its non-charging state unless it receives a subsequent charge enable command, it becomes fully charged, or it is disconnected from the charger.

If the plug-in vehicle receives a charge enable command after receiving the initial charge disable command (query task 320), then process 300 leads to task 310, which activates the charging state for the plug-in vehicle. If a subsequent charge enable command is not received, then process 300 leads to query task 322. If query task 322 determines that the onboard energy storage system is fully charged or if the plug-in vehicle has been disconnected from its charging power source, then process 300 leads to task 316 to transmit a charge termination notification as described previously. If not, then process 300 may be re-entered at query task 320 to repeat the processing loop represented by query task 320 and query task 322. Overall, process 300 provides for the remote management and regulation of charging of the plug-in vehicle.

Referring again to FIG. 4, the remote command center generates and transmits a charge enable command to the plug-in vehicle during task 414. If process 400 receives a charge termination notification from the plug-in vehicle (query task 416), then process 400 ends. In practice, the remote command center may update its records for the plug-in vehicle in response to the charge termination notification. If a charge termination notification is not received, then process 400 may continue to analyze the power load conditions for the power grid architecture (task 418) and the charging priority data as originally received or as updated (task 420). This ongoing monitoring of the current power load conditions is desirable to enable the charging system to react in real time (or substantially real time) to changing conditions. If the current conditions indicate that charging can be sustained, then process 400 can be re-entered at query task 416 to repeat the loop represented by tasks 416, 418, 420, and 422. If the current conditions indicate that charging can no longer be sustained, then process 400 leads to task 424.

As mentioned above, task 424 is performed when query task 412 determines that charging should not be initiated, or when query task 422 determines that charging cannot be continued. For task 424, the remote command center generates and transmits a charge disable command to the plug-in vehicle. If process 400 subsequently receives a charge termination notification from the plug-in vehicle (query task 426), then process 400 ends. If a charge termination notification is not received, then process 400 may continue to analyze the power load conditions for the power grid architecture (task 428) and the charging priority data as originally received or as updated (task 430). Again, this ongoing monitoring of the current power load conditions is desirable to enable the remote command center to remotely enable/disable charging of the plug-in vehicle in response to changing power load conditions. If the current conditions indicate that charging can now be sustained, then process 400 can be re-entered at task 414 to generate and transmit a charge enable command to the plug-in vehicle. If, however, the current conditions indicate that charging cannot be sustained, then process 400 can be re-entered at query task 426 to repeat the loop represented by tasks 426, 428, 430, and 432. Overall, process 400 enables the remote command center to enable, disable, and re-enable charging of the plug-in vehicle as necessary.

In an alternate embodiment, the plug-in vehicle need not wait for an initial charge enable command to begin charging its onboard energy storage system. Instead, the plug-in vehicle can immediately begin charging after connection with a compatible charger and after sending its charge request message to the remote command center. In this embodiment, charging will continue until the plug-in vehicle receives a charge disable command from the remote command center. Of course, charging will be terminated when the onboard energy storage system is fully charged or if the plug-in vehicle is disconnected from the power grid architecture.

The embodiment described above in connection with process 300 and process 400 contemplates a charging state and a non-charging state. An alternate embodiment of the charging control system may be configured to also support one or more partial or reduced power charging states, where the onboard energy storage system is charged at a reduced rate relative to the normal charging state. Such intermediate charging states can be activated when the power utility company would like to manage energy consumption by plug-in vehicles while still providing some charging.

The remote charging control system and methodologies described above can also be modified to give the power utilities companies more direct control over the charging cycles. In such a modified embodiment, the plug-in vehicle chargers are external to the vehicles, and the power utilities companies are given the ability (either directly or via the remote command center) to control whether or not power is available at the chargers. In other words, the decision and switching intelligence is implemented in the chargers rather than in the plug-in vehicles as described previously. To support this alternate system embodiment, each compatible charger is suitably configured with appropriate hardware, software, and/or firmware that enables it to communicate with the remote command center and/or the power utilities control center. Compatible chargers are also configured to respond to a received charge enable command or a received charge disable command in the manner described above in the context of onboard vehicle processing. In other words, these charge commands activate the charging and non-charging states, which are maintained by the chargers themselves. Of course, a practical embodiment may be suitably configured to support this modified charging methodology in addition to the charging methodology described in more detail above. For example, this additional feature is possible with off-board (external) chargers that would be in the range of 6.6 kW and higher. In contrast, an onboard 110 volt (1.5 kW) plug-in charger represents a completely self-contained charging system for the vehicle.

The techniques and technologies described here enable power utility companies to monitor, regulate, and manage the charging of plug-in vehicles such that charging of a plurality of plug-in vehicles can be scheduled in an appropriate manner, for example, to suit the power load balancing needs of the power grid. The remote charge control system will help utility companies to best utilize grid infrastructure and assure that power is available throughout the grid when needed.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method of controlling charging of an onboard energy storage system of a plug-in vehicle, the method comprising:
   wirelessly receiving, from the plug-in vehicle and using a cellular network service, a charge request for the onboard energy storage system, wherein the charge request is wirelessly received at a remote vehicle telematics system that supports bidirectional wireless data transfer with the plug-in vehicle;
   obtaining vehicle location data that indicates a location of the plug-in vehicle, the vehicle location data conveyed in the charge request;
   identifying, based on the vehicle location data, a power grid architecture to which the plug-in vehicle is connected;
   analyzing current power loading conditions for the power grid architecture;
   determining, from the charge request and the current power loading conditions, whether to charge the onboard energy storage system; and
   in response to the determining step, transmitting charge commands to the plug-in vehicle using the cellular network service, the charge commands comprising data that regulates charging of the onboard energy storage system, wherein the charge commands are influenced by the vehicle location data and by the current power loading conditions for the power grid architecture.

2. The method of claim 1, the charge commands comprising a charge enable command for the onboard energy storage system.

3. The method of claim 1, the charge commands comprising a charge disable command for the onboard energy storage system.

4. The method of claim 1, the charge request comprising priority data that indicates a relative charging priority for the plug-in vehicle, wherein the priority data influences the step of determining whether to charge the onboard energy storage system.

5. A system for controlling charging of onboard energy storage systems of plug-in vehicles, each of the plug-in vehicles comprising a charge control module for its onboard energy storage system, the system comprising:
- a remote vehicle telematics center configured to support bidirectional wireless data communication with the plug-in vehicles;
- a power grid architecture for delivery of electrical energy; and
- chargers coupled to the power grid architecture, the chargers being configured to provide charging energy from the power grid architecture to the onboard energy storage systems of the plug-in vehicles; wherein
- the remote vehicle telematics center is configured to remotely regulate charging of the onboard energy storage systems of the plug-in vehicles using charge commands transmitted from the remote vehicle telematics center to the plug-in vehicles, wherein the remote vehicle telematics system is configured to:
  - wirelessly receive charge requests from the plug-in vehicles using a cellular network service, each charge request conveying vehicle location data that indicates a location of a plug-in vehicle;
  - identify, based on the vehicle location data, a power grid architecture to which the plug-in vehicle is connected;
  - analyze current power loading conditions for the power grid architecture;
  - determine, from the charge request and the current power loading conditions, that an onboard energy storage system of the plug-in vehicle should be charged; and
  - wirelessly transmit charge commands to the plug-in vehicle using the cellular network service, the charge commands comprising data that regulates charging of the onboard energy storage system of the plug-in vehicle.

6. The system of claim 5, the remote vehicle telematics center being configured to transmit charge enable commands for processing by the charge control modules of the plug-in vehicles, the charge enable commands activating a charging state of the onboard energy storage systems.

7. The system of claim 5, the remote vehicle telematics center being configured to transmit charge disable commands for processing by the charge control modules of the plug-in vehicles, the charge disable commands activating a non-charging state of the onboard energy storage systems.

8. The system of claim 5, the remote vehicle telematics center being configured to generate a charging schedule for plug-in vehicles coupled to the power grid architecture, the charging schedule being influenced by power load conditions for the power grid architecture.

* * * * *